(12) United States Patent
Nakajima

(10) Patent No.: US 7,336,381 B2
(45) Date of Patent: Feb. 26, 2008

(54) PRINT SERVICE SYSTEM, PRINT SERVICE METHOD, PRINT ORDER MANAGEMENT APPARATUS, AND PRINT REQUEST INFORMATION GENERATING APPARATUS

(75) Inventor: Toshio Nakajima, Saitama (JP)

(73) Assignee: FUJIFILM Corporation, Tokyo (JP)

(*) Notice: Subject to any disclaimer, the term of this patent is extended or adjusted under 35 U.S.C. 154(b) by 743 days.

(21) Appl. No.: 10/298,930

(22) Filed: Nov. 19, 2002

(65) Prior Publication Data
US 2003/0095283 A1 May 22, 2003

(30) Foreign Application Priority Data
Nov. 20, 2001 (JP) ............ P.2001-354580

(51) Int. Cl.
G06F 3/12 (2006.01)
G06F 1/163 (2006.01)
G04Q 30/00 (2006.01)

(52) U.S. Cl. ........................ 358/1.15; 705/26

(58) Field of Classification Search .......... 358/1.15, 358/1.16, 1.18, 1.116; 705/1, 515, 26; 710/33, 710/31; 709/203, 230–237; 370/278
See application file for complete search history.

(56) References Cited

U.S. PATENT DOCUMENTS 6,715,003 B1 * 3/2004 Safai .................... 710/33
2002/0012134 A1 * 1/2002 Calaway ................. 358/1.18
2002/0087601 A1 * 7/2002 Anderson et al. .......... 707/515
2005/0182652 A1 * 8/2005 McIntyre et al. .......... 705/1
2006/0012828 A1 * 1/2006 Ohta ..................... 358/1.18

FOREIGN PATENT DOCUMENTS

| JP | 7-200208 A | 8/1995 |
| JP | 11-282642 A | 10/1999 |
| JP | 2001-94695 A | 4/2001 |
| JP | 2001-103228 A | 4/2001 |
| JP | 2001-197407 A | 7/2001 |
| JP | 2001-274937 A | 10/2001 |

* cited by examiner

Primary Examiner—Scott A. Rogers
(74) Attorney, Agent, or Firm—Sughrue Mion, PLLC

(57) ABSTRACT

A user who needs prints of digital images shot by the digital camera generates a print request information, and sends the generated print request information to a print order management server via a print order receiving terminal and a network. The print request information includes digital image information to be printed, receiver identification information to identify print receivers associated with each piece of digital image information, and information indicating print conditions for each digital image and each print receiver. The print order management server, receiving print request information, determines the printing location for each receiver based on the concurrently received receiver information or pre-registered receiver information. The print order management server then sends the print order information for each receiver to a print server corresponding to the determined printing location.

34 Claims, 7 Drawing Sheets

FIG. 6

| IMAGE NO. | RECEIVER ID | SIZE | NUMBER OF PRINTS | PAPER | PRINT METHOD | EDGED PRINT |
|---|---|---|---|---|---|---|
| 1 | X04 | S | 1 | A | M | 0 |
| 1 | X08 | S | 1 | A | M | 0 |
| 1 | X11 | L | 1 | A | M | 0 |
| 2 | X08 | S | 1 | A | M | 0 |
| 3 | X04 | S | 1 | A | M | 0 |
| 4 | X11 |  | 1 | A | M | 0 |
| 5 | X05 | S | 1 | A | M | 0 |
| 5 | X06 | L | 1 | A | M | 0 |
| 5 | X08 | S | 1 | A | M | 0 |
| 5 | X10 | L | 1 | A | M | 0 |
| 6 | X04 | S | 1 | A | M | 0 |
| ⋮ | ⋮ | ⋮ | ⋮ | ⋮ | ⋮ | ⋮ |
| 41 | X01 | L | 1 | A | M | 1 |
| 41 | X03 | L | 1 | A | M | 1 |
| 41 | X04 | L | 1 | A | M | 1 |
| 41 | X06 | L | 1 | A | M | 1 |
| 41 | X07 | L | 1 | A | M | 1 |
| 41 | X10 | L | 1 | A | M | 1 |

| RECEIVER | RECEIVER ID | ZIP CODE | PHONE NUMBER | E-MAIL | RECEIPT METHOD | PAYMENT METHOD |
|---|---|---|---|---|---|---|
| AOKI | X01 | | | | | |
| OGAWA | X02 | | | | | |
| KONDO | X03 | | | | | |
| SATO | X04 | | | | | |
| SUZUKI | X05 | | | | | |
| TAKAHASHI | X06 | | | | | |
| TANAKA | X07 | | | | | |
| NAKAMURA | X08 | | | | | |
| HASHIMOTO | X09 | | | | | |
| MORI | X10 | | | | | |
| YAMADA | X11 | | | | | |

FIG. 10

| IMAGE NO. | PERSON WHO WANTS TO PRINT |
|---|---|
| 1 | YAMADA, NAKAMURA, SATO |
| 2 | NAKAMURA |
| 3 | SATO |
| 4 | YAMADA |
| 5 | SUZUKI, NAKAMURA, TAKAHASHI, MORI |
| 6 | KONDO |
| 7 | AOKI |
| 8 | OGAWA |
| 9 | AOKI, OGAWA |
| 10 | AOKI, TANAKA |
| 11 | KONDO |
| 12 | HASHIMOTO |
| 13 | SATO, NAKAMURA, KONDO |
| 14 | SUZUKI |
| 15 | MORI |
| 16 | NAKAMURA, YAMADA |
| 17 | TAKAHASHI |
| 18 | TANAKA |
| ⋮ | ⋮ |
| 41 | AOKI, KONDO, SATO, TAKAHASHI, TANAKA, MORI |
| 42 | OGAWA, SUZUKI, HASHIMOTO, YAMADA |

PRINT SERVICE SYSTEM, PRINT SERVICE METHOD, PRINT ORDER MANAGEMENT APPARATUS, AND PRINT REQUEST INFORMATION GENERATING APPARATUS

BACKGROUND OF THE INVENTION

1. Field of the Invention

The present invention relates to a print service system and a print service method for performing a print generation service which is based on digital image information, and a print order management apparatus and print request information generating apparatus used for the print service.

2. Description of the Related Art

A hard copy of an image shot by a digital camera is easily acquired by printing one on a color printer at home. When quality image prints or a large number of prints are in need, a request for printing is made by carrying a recording medium where digital image data is recorded to a print service shop which provides a quality print service, or by transmitting digital image data over a network. Digital image data can be transmitted to an arbitrary printing location so that a service has been provided whereby a user may specify the method for receiving generated image prints, over-the-counter delivery or home delivery, as well as the target shop in case the over-the-counter delivery is selected.

One characteristic of a digital camera is that a user is able to check a shot image on demand and thus is able to request necessary number of prints per image, without generating image prints like in a silver-salt photo processing. For example, a user is able to check images shot during a group tour on the display of a digital camera then specify the prints each participant wants for later print requests.

The image prints thus generated are received in a lump sum by the requester on a per print request basis, same as the silver salt photos. Thus the workload of distributing prints to the persons who want prints remains heavy. The print charge is paid in a lump sum by the print requester. Thus the settlement of the total charge per person who wants prints is cumbersome.

SUMMARY OF THE INVENTION

The invention has been proposed in view of the aforementioned circumstances and aims at providing a print service system and a print service method whereby receipt and charge payment of the generated image prints are performed for each person who wants prints while a request for, prints by a plurality of persons who wants prints is made in a lump sum.

A print service system according to the invention performs a print generating service which is based on digital image information, the system comprising print request information generating apparatus for inputting receiver identification information to identify print receivers who want prints of the digital image information and generating print request information where the input receiver identification information is associated with the digital image information, and print order management apparatus for inputting the print request information and sending to a printing location the print order information for each of the receivers including the digital image information to be printed, wherein the print order management apparatus acquires receiver information including a method for receiving the generated prints for the receives identified using the receiver identification information, determines a printing location for each of the receivers based on the receivers, and sends print order information for each of the receivers to the printing location.

The print request information in the print service system according to the invention includes print condition information for each of the receivers associated with the digital image information.

Association of the print condition information with the digital image information in the print service system according to the invention is performed by appending additional information to the digital image information.

The receiver information in the print service system according to the invention includes address information of the receivers and the print order management apparatus uses the address information to determine a printing location for each of the receivers.

The receiver information in the print service system according to the invention includes print charge payment information of the receivers and the print order information includes the print charge payment information.

The receiver information acquired by the print order management apparatus in the print service system according to the invention includes pre-registered information.

The print request information generating apparatus in the print service system according to the invention inputs the receiver information corresponding to the input receiver identification information, and the receiver information acquired by the print order management apparatus includes information generated and sent together with the print request information by the print request information generating apparatus.

The print request information generating apparatus in the print service system according to the invention is a digital camera.

The print request information generating apparatus in the print service system according to the invention is a digital camera or a terminal to which a recording medium storing digital image information can be connected.

The print order management apparatus in the print service system according to the invention is a server computer connected to a network.

The print order management apparatus in the print service system according to the invention outputs information to notify the receivers of completion of printing at the printing location.

A print service method according to the invention performs a print generating service which is based on digital image information by using a computer, comprising a step of inputting the digital image information with which is associated receiver identification information to identify one or more receivers, a step of acquiring receiver information including a method for receiving the generated prints for receivers identified by the receiver identification information, a step of determining a printing location for each of the receivers based on the receiver information, and a step of sending to the printing location the print order information for each of the receivers including the digital image information to be printed.

Print condition information for each of the receivers is associated with the input digital image information in the print service method according to the invention, in correspondence to the receiver identification information.

Association of the print condition information with the digital image information in the print service method according to the invention is performed by appending additional information to the digital image information.

The receiver information in the print service method according to the invention includes address information of the receivers and the step of determining a printing location for each of the receivers uses the address information.

The receiver information in the print service method according to the invention includes print charge payment information of the receivers and the print order information includes the print charge payment information.

The receiver information acquired in the print service method according to the invention includes pre-registered information.

A print service method according to the invention further comprises a step of notifying the receivers of completion of printing at the printing location.

Print order management apparatus according to the invention is used for a print generating service which is based on digital image information, inputs the digital image information with which is associated receiver identification information to identify one or more receivers, acquires receiver information including a method for receiving the generated prints for receivers identified by the receiver identification information, determines a printing location for each of the receivers based on the receiver information, and sends to the printing location the print order information for each of the receivers.

Print condition information for each of the receivers is associated with the input digital image information in the print service method according to the invention, in correspondence to the receiver identification information.

Association of the print condition information with the digital image information in the print service method according to the invention is performed by appending additional information to the digital image information.

The receiver information in the print order management apparatus according to the invention includes address information of the receivers and determination of a printing location for each of the receivers uses the address information.

The receiver information in the print order management apparatus according to the invention includes print charge payment information of the receivers and the print order information includes the print charge payment information.

The receiver information acquired in the print order management apparatus according to the invention includes pre-registered information.

Print order management apparatus according to the invention outputs information to notify the receivers of completion of printing at the printing location.

The print order management apparatus according to the invention is a server computer connected to a network.

Print request information generating apparatus according to the invention is used for a print generating service which is based on digital image information, inputs receiver identification information to identify print receivers who want prints of the digital image information, associates the input receiver identification information with the digital image information, and sends print request information including the digital image information with which the receiver identification information is associated to print order management apparatus for managing print orders of the print generating service.

The print request information in the print request information generating apparatus according to the invention includes print condition information for each of the receivers associated with the digital image information.

Association of the print condition information with the digital image information in the print request information generating apparatus according to the invention is performed by appending additional information to the digital image information.

Print request information generating apparatus according to the invention further inputs the receiver information corresponding to the input receiver identification information, and sends the input receiver information together with the print request information to the print order management apparatus.

The print request information generating apparatus according to the invention is a digital camera.

The print request information generating apparatus according to the invention is a digital camera or a terminal to which a recording medium storing digital image information can be connected.

BRIEF DESCRIPTION OF THE DRAWINGS

FIG. 6 shows an example of association of receiver identification information and print condition information with digital image information;

FIG. 10 shows an example of a per-image print want list.

Figure 1:
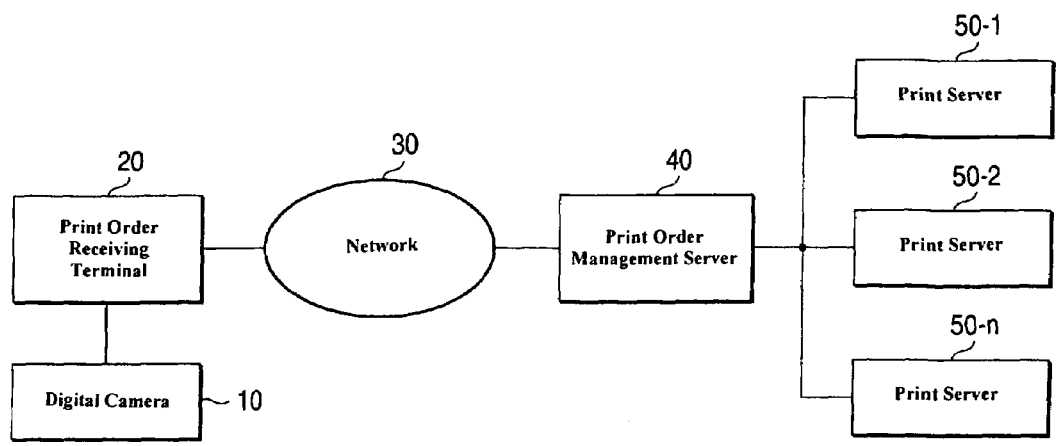
FIG. 1 shows a general configuration of a print service system according to the invention.

In the figures, a reference numeral 10 refers to a digital camera; 11 to an image pickup section; 12 to an image memory; 13 to a compression/expansion section; 14 to an image recording section; 15 to a controller; 16 to an operation section; 17 to an input/Output interface; 18 to a display; 20 to a print order receiving terminal; 21 to a controller; 22 to an input/Output interface; 23 to an information recording section; 24 to a display; 25 to an operation section; 26 to a communications section; 30 to a network; 40 to a print order management server; 41 to a controller; 42 to a storage; 43 to a file unit; 44 to a communications section; 50-1, 50-2, and 50-*n* . . . to print servers; and 151 to a request information generation processor.

DETAILED DESCRIPTION OF THE PREFERRED EMBODIMENTS

An embodiment of the invention will be described referring to drawings.

FIG. 1 shows a general configuration of a print service system according to the invention. To a network 30 is connected a print order management server 40, to which are connected a plurality of print servers 50-1, 50-2, 50-*n*. The print servers 50-1, 50-2, 50-*n* are provided in a service shops or labs which performs print processing based on digital image information and causes one or more print units (not shown) to perform predetermined print processing. While three print servers 50-1, 50-2, 50-*n* are directly connected to the order management server 40 in FIG. 1, the number of print servers is not limited to three and those servers may be connected via the network 30 or another network.

To the network 30 is connected a print order receiving terminal 20, to which a digital camera 10 may be connected. The print order receiving terminal 20 may be a multi-function terminal provided in a convenience store and receives a print request from a user. While a single terminal is shown in FIG. 1, a number of terminals are provided in actual practices. The print order receiving terminal 20 may be any terminal which can be connected to the network 30, so that a PC or a portable terminal for individual use may be employed.

A user who needs prints of digital images shot by the digital camera 10 generates a print request information following the procedure mentioned later, and sends the generated print request information to the print order management server 40 via the print order receiving terminal 20 and the network 30. The print request information includes digital image information to be printed, receiver identification information to identify one or more print receivers who want prints associated with each piece of digital image information, and information indicating print conditions such as print system, print size and number of prints for each digital image and each print receiver. Association of the receiver identification information and the print conditions is preferably performed by appending additional information to the digital image information. A list may be prepared where receiver identification information and print conditions are keyed to print image information numbers.

Requester information such as the address and telephone number of a person sending print request information and receiver information where information on print receipt including a print receipt method for the print receiver is keyed to receiver identification information are generated as well and sent to the print order management server 40 together with the print request information. Payment of print charge may be lump-sum payment by the print requester or individual payment by each of the receivers. Thus the print request information includes information to distinguish between lump-sum payment and individual payment. Payment method for each receiver in individual payment is included in the receiver information. Information on pre-registered receivers need not be generated or sent. The registration location may be in the print order management server 40 or any other device accessible to the print order management server 40.

The print order management server 40, receiving print request information, determines the printing location for each receiver based on the concurrently received receiver information or pre-registered receiver information. The print order management server 40 then sends the print order information for each receiver to a print server corresponding to the determined printing location. The print order information includes information to identify the receiver such as receiver identification information and name, digital image information to be printed, print condition information, and payment information.

Figure 2:
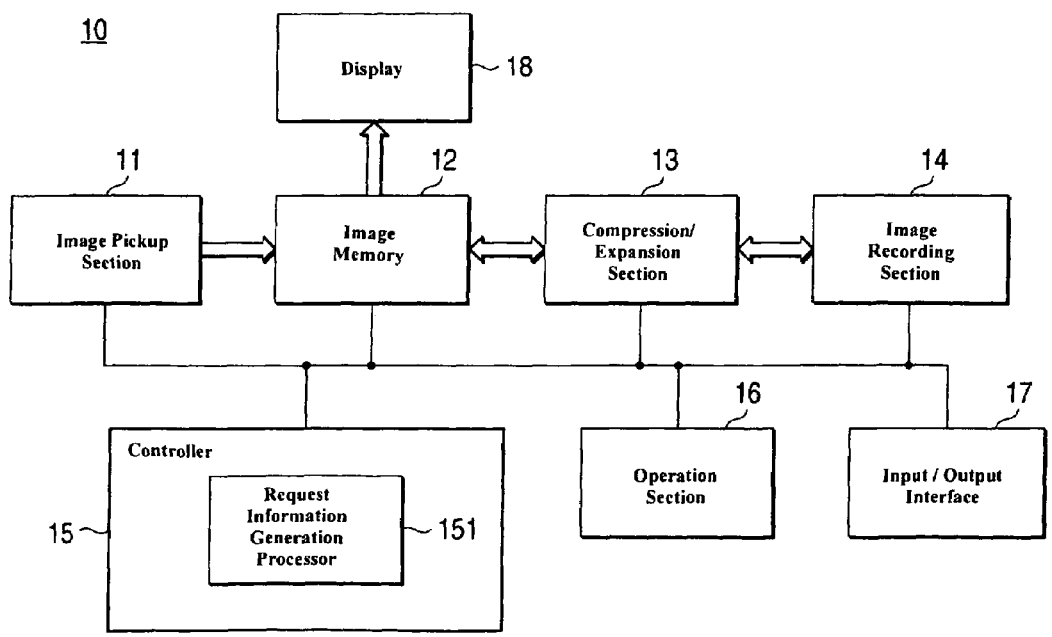
FIG. 2 shows a general configuration of a digital camera of a print service system according to the invention.

FIG. 2 shows a general configuration of a digital camera 10 of a print service system according to FIG. 1. The digital camera 10 in FIG. 2 comprises an image pickup section 11, an image memory 12, a compression/expansion section 13, an image recording section 14, a controller 15, an operation section 16, an input/output interface 17, and a display 18.

The image pickup section 11 comprises an optical system such as a shooting lens, an image pickup element such as a CCD, and a signal processor (none of these are shown). An image of a subject focused on the light detecting surface of an image pickup element via a shooting lens undergoes photo-electric conversion in the image pickup element and sequentially read as a picture signal. Then the picture signal is sent to a signal processor where the picture signal undergoes predetermined analog processing in a gain adjustment circuit and A/D conversion, then digital image processing, and is finally stored into an image memory 12. Digital image processing in the image processor is performed by DSP.

The image memory 12 temporarily stores a digital image signal acquired into the image pickup section 11, and is capable of displaying a shot image on the display 18 based on this signal. The image memory 12 further stores the image signal obtained by expanding the image information stored in the image recording section 12 and displaying the image signal on the display 18. The display 18 comprises a liquid crystal panel and displays various information such as the state information and operation support information of a digital camera under control of the controller 15.

The compression/expansion section 13 compresses a digital image signal temporarily stored in the image memory 12 and sends the resulting signal to the image recording section 14 as well as expands the compressed image information stored in the image recording section 14 and stores the resulting image information into the image memory 12. The image recording section 14 stores the image information obtained by compressing the shot image signal in a predetermined file format. Then image recording section 14 may comprise a flash memory for example, a memory built into the digital camera 10, or a medium such as a memory card. The contents of the image recording section 14 may be extracted outside under the control of the controller 15 via the input/output interface 17. An interface dedicated to transfer of images may be separately provided in order to transfer image information from the image recording section 14.

The controller 15 comprises a request information generation processor 151 and controls the overall operation of the digital camera 10 including the operation described later, and in particular, comprises mainly processors which operate in accordance with programs. The request information generation processor 151 performs print request information generation processing to associate receiver identification information to identify the print receivers who want prints which are based on the digital image information stored in the image recording section 14 with the digital image information.

The operation section 16 is provided for various operations of the digital camera 10 and includes a section for shooting operation such as a shutter release button, a section for displaying/operating an image which is based on image information stored in the image recording section 14, and a section for generating/operating print request information. The input/output interface 17 exchanges information between the digital camera 10 and external devices by way of wired or radio communications.

The digital camera 10 thus configured allows ordinary shooting operation through operation of the operation section 16 as well as generation of print request information which is based on digital image information stored in the image recording section 14.

Figure 3:
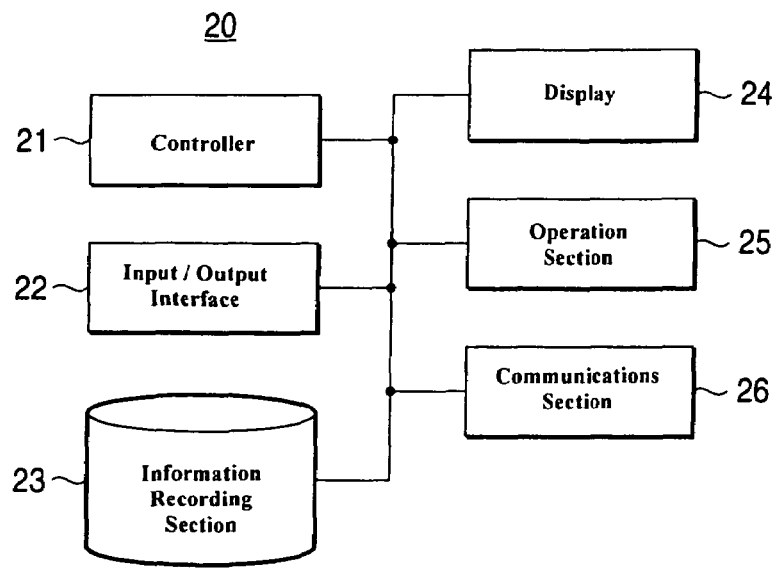
FIG. 3 shows a general configuration of the print order receiving terminal of a print service system according to the invention.

FIG. 3 shows a general configuration of the print order receiving terminal 20. The print order receiving terminal 20 in FIG. 3 comprises a controller 21, an input/output interface 22, an information recording section 23, a display 24, an operation section 25, and a communications section 26. The information recording section 23 may be omitted.

The controller 21 controls the entire print order receiving terminal 20 including transmission of print request information generated by the request information generation processor 151 of the digital camera 10 to the print order management server 40, and mainly comprises processors which operate with programs. The input/output interface 22 can be connected to the input/output interface 8 of the digital camera 10 and exchanges information to/from the digital camera 10. The input/output interface 22 may be arranged to allow connection of a memory card.

The information recording section 23 records print request information and digital image information from the input/output interface 22 and comprises for example a hard disk. The display 24 displays the state and operation guidance of the print order receiving terminal 20. As mentioned later, when print request information is generated on the print order receiving terminal 20, the display 24 also displays images to be ordered. The operation section 25 performs various operations of the print order receiving terminal 20. The communication sections is connected to the network 30 and sends print request information.

Figure 4:
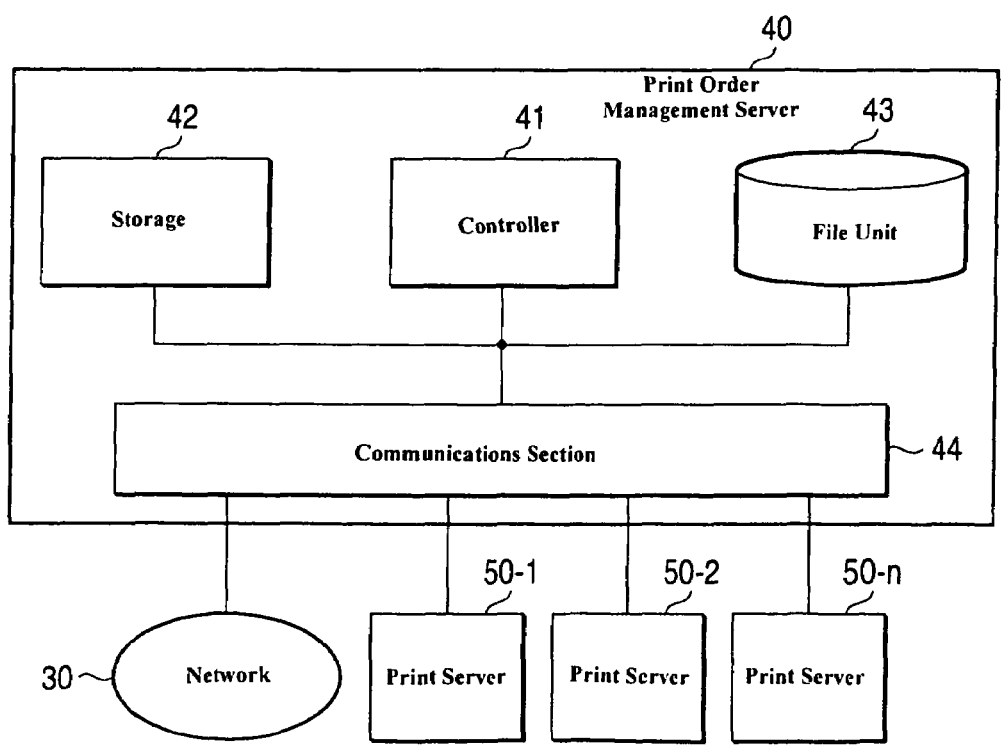
FIG. 4 shows a general configuration of a print order management server of a print service system according to the invention.

FIG. 4 shows a general configuration of a print order management server of a print service system in FIG. 1. The print order management server 40 comprises a controller 41, a storage 42, a file unit 43 and a communications section 44. The controller 41 controls the overall operation of the print order management server 40, and in particular, comprises mainly processors which operate in accordance with programs stored in the storage 42. The storage 42 stores various data for controlling the programs and the operation of the print order management server 40 and is used as a temporary storage area to store print order request information sent from the print order receiving terminal 20 via the network 30 as well as a work area for the processor.

The file unit 43 retains at least printing location information. When receiver information is registered, the file unit 43 retains information such as the receiver's name, address, e-mail address, print receipt method, and print charge payment method. Registration of receiver information may be generated using the receiver information sent at the time of print request, or a receiver may access the print order management server in advance to register receiver information. The printing location retained in the file unit records information such as the printing throughput of the print location and delivery area information corresponding to the printing location or print server. The printing throughput includes acceptable print systems, print sizes and the corresponding processing speeds. The communications section 44 controls communications with the network 30 and print servers 50-1, 50-2, 50-n.

Figure 5:
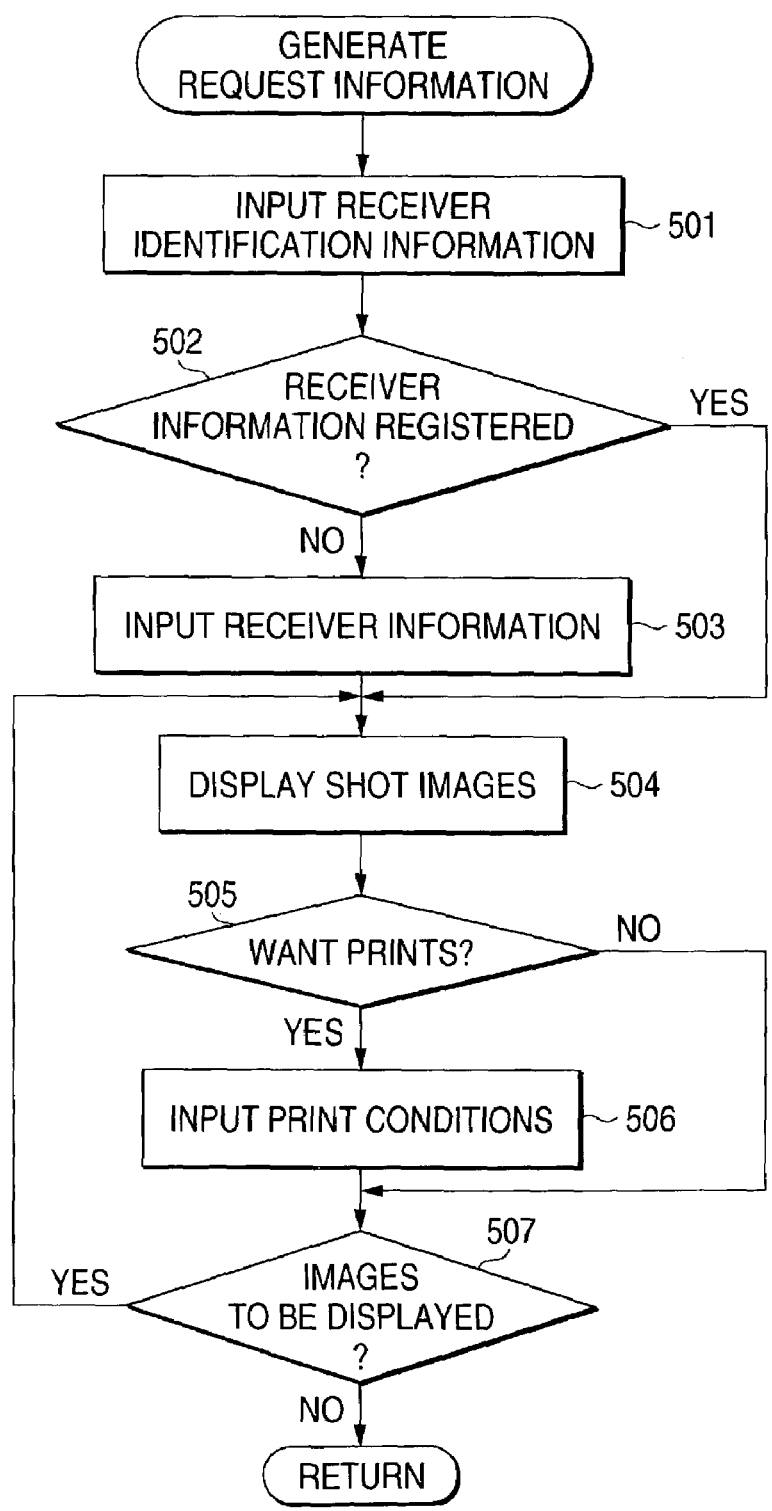
FIG. 5 shows a general operation flow of generating print request information.

Next, operation of the print service system in FIG. 1 will be described referring to FIGS. 5 through 10. FIG. 5 shows a general operation flow of the digital camera 10 in the course of generating print request information. To generate print request information which is based on the digital image information stored in the image recording section 14 of the digital camera 10 in FIG. 2, the print request information generating mode is selected through operation of the operation section 16 of the digital camera 10. In step 501, receiver identification information to identify the receivers who want prints is input. In case the receiver identification information is pre-registered in the print order management server 40, the identification information is input. Otherwise, appropriate identification information is input anew. The identification information input anew may be such that persons who want prints to be requested concurrently may be identified. Thus the information automatically generated in the digital camera 10 may be selected.

In response to an inquiry (step 502) as to whether the input receiver identification information has been registered or not, receiver information is input anew in case not registered (step 503). As receiver information, information such as the receiver's name, address, e-mail address, print receipt method, and print charge payment method is selected or input in accordance with the guidance on the display 18. The information input here need not complete enough but may include a method for receiving finished prints and necessary information of necessary accuracy in accordance with the input print receipt method. For example, in case over-the-counter receipt through cash on delivery is selected as a receipt method, a ZIP code, address and telephone number (telephone number and e-mail address) to report receiving destination will suffice.

When input of the receiver information is complete, in step 504, an image which is based on digital image information stored in the image recording section 14 is sequentially displayed on the display 18. In response to an inquiry (step 505) on requests for prints of displayed images, print conditions are input in case request is made. Print conditions including print size, number of prints, paper type and printing method are input.

When input processing concerning the displayed images is over, it is checked whether there remains more image information to be displayed in the image recording section 14 in step 507. In case there remains more information, execution returns to step 504 to repeat the same processing. In case print requests are made for the displayed images, the receiver identification information and print condition information are associated with the digital image information corresponding to the desired images.

FIG. 6 shows an example of association of receiver identification information and print condition information with digital image information. In the example of FIG. 6, print request by three persons for the image having the image number 1 out of the images stored in the image recording section 14 of the digital camera 10. The corresponding receiver identification information (ID) indicates "X04," "X08," and "X11" respectively. Print conditions such as paper size are set on the basis of receiver identification information. Such associated information may be generated as a file in the format shown in FIG. 6 but is preferably appended as additional information to individual image information.

Figures 7, 8:
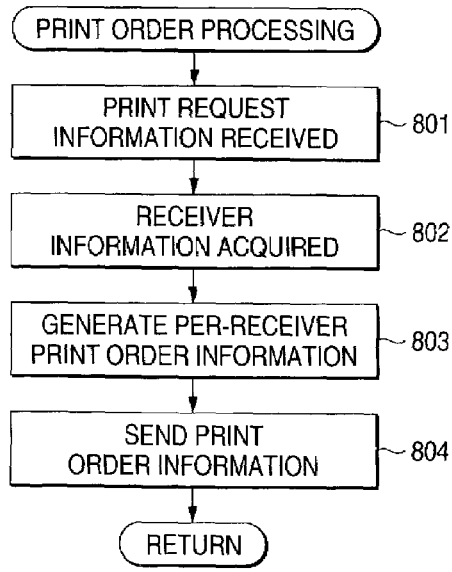
FIG. 7 shows an example of receiver information.
FIG. 8 shows a general flow of print order processing by the print order management server.

FIG. 7 shows an example of receiver information. In the example of FIG. 7, items of receiver identification information (ID), ZIP code, telephone number, e-mail address, print receipt method, and charge payment method are provided for each receiver. In step 503 in FIG. 5, each item is filled in as required and sent to the print order management server 40 at the time of print request. Receiver information is not limited to the items shown in FIG. 7 but more detailed items may be registered. It is not appropriate to ask for filling in all the items in step 503 in FIG. 5. Detailed information is preferably obtained via an inquiry using e-mails.

Once print request information and receiver information are generated by using the digital camera 10, the owner of the digital camera 10 connects the digital camera 10 to the print order receiving terminal 20 to make a print request. The print order receiving terminal 20, when the digital camera 10 is connected and a print request is instructed by way of operation of the operation section 25, prompts input of requester information such as the address and telephone number of the print requester, and on completion of input of requester information, sends print request information, receiver information, and requester information to the print order management server 40. Before sending the information, the print order receiving terminal 20 specifies whether print charge will be paid in a lump sum by the print requester or individually by each receiver. In case lump-sum payment is specified, the print order receiving terminal 20 inputs information on a method for lump-sum payment such as a credit number, then sends the information.

In case the print requester is predetermined, the requester information may be input to the digital camera 10 in advance. In case the requester also requests receipt of prints, the requester's flag may be appended to the receiver information and input of the requester information may be omitted because the receiver information includes information such as addresses and telephone numbers of the receivers.

Next, operation of the print order management server 40 assumed when print request information is received from the print order receiving terminal 20. FIG. 8 shows a general flow of print order processing on receipt of print request information.

On receiving print request information in step 801, the print order management server 40 temporarily stores the print request information as well as the concurrently received receiver information and requester information into the storage 42. As mentioned earlier, the receiver information may not be sent from the print order receiving terminal 20. In step 802, the print order management server 40 acquires receiver information based on the receiver identification information included in the print request information. That is, the print order management server 40 searches through the file unit 43 to acquire registered receiver information, and stores into the storage 42 the received information together with the received receiver information as receiver information employed for ordering.

Then, in step 803, the print order management server 40 generates order information for each receiver based on the receiver information acquired for the receivers identified by the print receiver identification information. In generating the order information, the print order management server 40 determines the printing location for each receiver. The printing location is determined in accordance with the information including the print receipt method, address (ZIP code) of the receiver, print conditions, printing throughput of the printing location and service details.

In case the print receipt method is over-the-counter receipt, the print order management server 40 checks whether the receipt location such as the target service shop or target agency is specified in the receiver information, and in case its is not specified, the print order management server 40 determines the receive-from service shop or agency from the address of the receiver. The print order management server 40 selects a printing location most efficient for a specified or determined receive-from location for a receiver to acquire generated prints as the printing location for the receiver. For example, in case prints to satisfy the print conditions of the receiver is possible at a determined receive-from location, the print order management server 40 sends order information to the print server of the receive-from location. Otherwise, the print order management server 40 determines the printing location where delivery to the receive-from location may be made efficiently as the printing location for the receiver. In this case, different printing locations may be selected depending on the print conditions.

In case delivery of prints is desired, the print order management server 40 determines the printing location for the receiver in accordance with the address of the receiver, printing throughput of the printing location and service details. In particular, the print order management server 40 selects the printing location closest to the address of the receiver from among the printing locations supporting delivery service and satisfying the print conditions for the receiver. In this case, a large-scale lab provided per determined service area is preferably selected as the printing location. Considering streamlining of the delivery service, a printing location capable of printing all images is preferably selected per receiver.

When printing locations are determined per receiver and per image, the print order management server 40 generates order request information on a per receiver/printing locations basis. The print order information includes the receiver identification, information to identify the receiver such as the name of the receiver, image information to be printed and print condition information, payment information, and print receipt method. The payment information indicates lump-sum payment by the print requester or individual payment and the method for individual payment. Methods for individual payment preferably include cash on delivery on receipt of prints and payment on credit. The lump-sum payment by the print requester is preferably payment on credit or advance payment. The print receipt method is specified to recognize the processing following printing process at the printing location. For example, in case over-the-counter receipt at a service shop other than the printing location is specified, the printing location will send the finished prints to the service on completion of printing.

When the print order information is generated, the print order management server 40 sends per-receiver order information to the print server of the determined printing location in step 804. In case order information of a plurality of receivers is sent to a single print server, digital information to be printed is sent as a common file to a plurality of receivers in order to reduce the amount of send data.

The printing location performs printing based on the received print order information and delivers/stores the prints in accordance with the selected receipt method. On completion of printing, the address, telephone number and e-mail address may be used to report completion of printing. In the case of over-the-counter receipt, the name of the receive-from service shop may be also reported. In case delivery of prints is desired, the scheduled delivery date may be reported. Completion of printing may be reported by the printing location or the print order management server 40 based on the print completing report from the printing location.

While the print request information generated by the digital camera is sent to the print order management server 40 with the digital camera 10 connected to the print order receiving terminal 20 in the foregoing description, in case the image recording section 14 of the digital camera 10 is a detachable recording medium such as a memory card, print request information and all receiver information if necessary may be stored on this recording medium and the information may be sent with this recording medium connected to the input/output interface 22 of the print order receiving terminal 20.

Print request information may be generated using the print order receiving terminal 20. In this case, the digital camera 10 or a recording medium where digital image information is recorded is connected to the print order receiving terminal 20 to display the image on the display 24, then the operation section 25 is operated to generate print request information. The print request information may be input by a receiver who wants prints, same as generation using the digital camera 10. In case the print order receiving terminal 20 is installed in a shop, a print requester preferably inputs the print request information in a lump sum.

Figure 9:
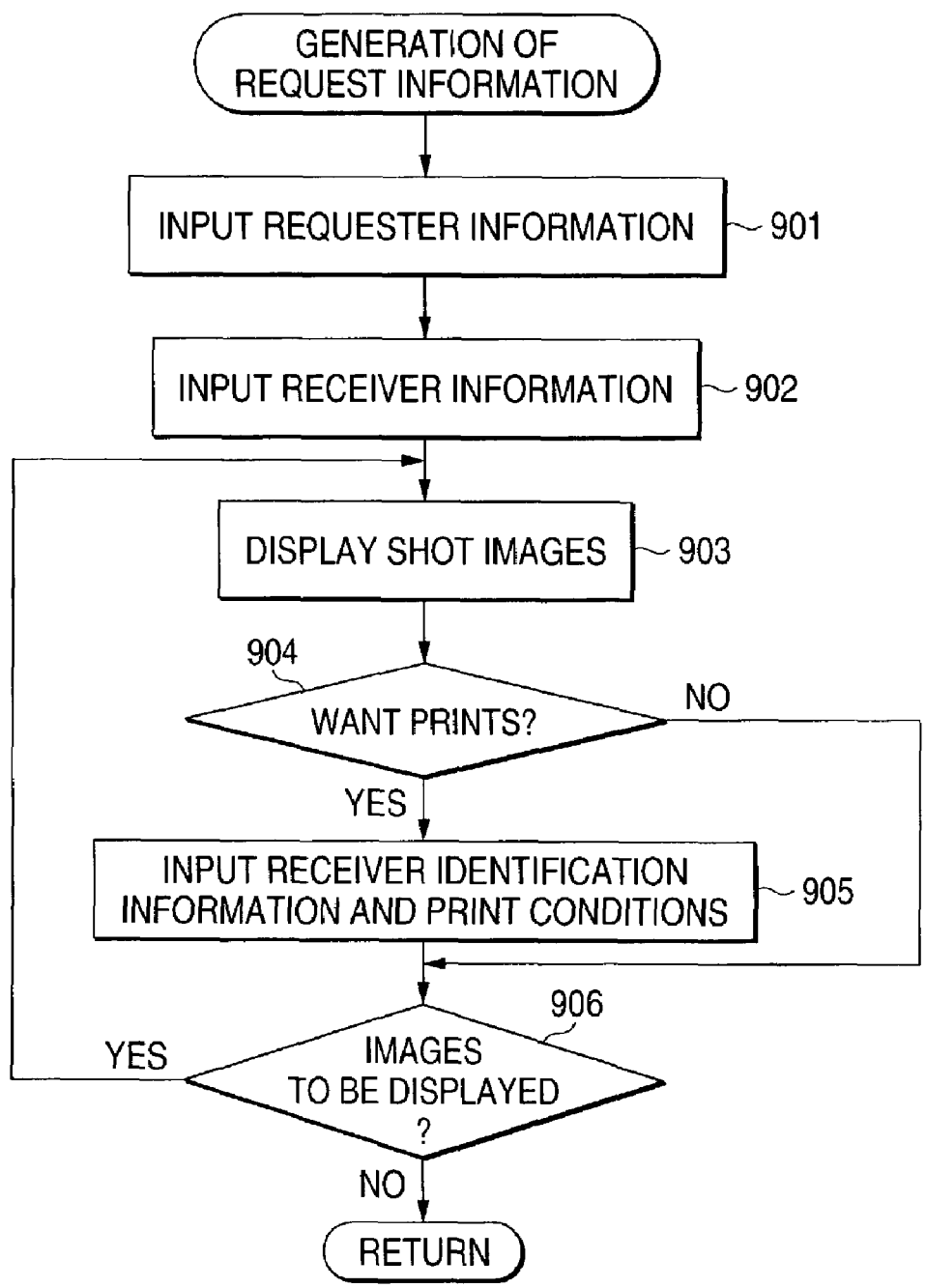
FIG. 9 shows another example of general operation flow of print request information generation processing.

FIG. 9 shows a general operation flow of the print order receiving terminal 20 in the course of generating print request information in a lump sum. In case the print request information is generated in a lump sum, a list specifying persons who want prints on a per image basis as shown in FIG. 10 and a list specifying the receiver identification information (ID), ZIP code, telephone number, e-mail address, receipt method, and charge payment method corresponding to the name of each of the persons (receivers) who want prints shown in FIG. 7 must be provided in advance.

In case print request information is generated using the print order receiving terminal 20, the print order receiving terminal 20, a digital camera 10 or a recording medium where digital image information is stored is connected and print request information generating mode is selected through operation of the operation section 25. In step 901, requester information is input. The requester information is input in accordance with the requester information input menu on the display 24, same as input prior to transmission of the print request information mentioned earlier.

In step 902, receiver information is input based on a list shown in FIG. 7. On completion of input of receiver information, images which are based on the digital image information stored in the image recording section 14 are sequentially displayed on the display 24. A response is made to an inquiry on the presence/absence of the persons who want prints of displayed images. Whether persons who want prints are present is checked against a list shown in FIG. 10. In case persons who want prints are present, the receiver identification information and print conditions for the persons who want prints are input (step 905) to associate receiver identification information and print conditions with the digital image information. Input of the receiver identification information is performed referring to a print want list shown in FIG. 10 and a receiver information list shown in FIG. 7. Input of print conditions is performed referring to a print want list shown in FIG. 10 (print conditions are not shown in FIG. 10).

When input processing concerning the displayed images is over, it is checked whether there remains more image information to be displayed in the image recording section 14 in step 906. In case there remains more information, execution returns to step 903 to repeat the same processing.

Once print request information, receiver information and requester information have been input, The print order receiving terminal 20 sends the print request information, receiver information and requester information to the print order management server 10. Before sending the information, the print order receiving terminal 20 specifies whether print charge will be paid in a lump sum by the print requester or individually by each receiver. In case lump-sum payment is specified, the print order receiving terminal 20 inputs information on a method for lump-sum payment such as a credit number, then sends the information.

As understood from the foregoing description, according to the invention, it is possible to receive generated mage prints and pay the print charge for each person who wants prints, even in case a request for prints a plurality of persons want is made in a lump sum.

What is claimed is:

1. A print service system for performing a print generating service based on digital image information comprising at least one digital image, said system comprising:
   a print request information generating apparatus for inputting receiver identification information to identify print receivers who want prints of said digital image information and generating print request information where said input receiver identification information is associated with said digital image information, wherein for one digital image, said input receiver identification information associated with said one digital image comprises a plurality of receivers who want prints of said one digital image; and
   a print order management apparatus for inputting said print request information and sending to a printing location print order information for each of said receivers including said digital image information to be printed;
   wherein said print order management apparatus acquires receiver information including a method for receiving the generated prints for each of the receivers identified using said receiver identification information, determines a printing location for each of said receivers based on said receiver information, and sends the print order information for each of said receivers to said printing location, and
   wherein said print order information further comprises an information element, which indicates whether a requestor of print order is to be charged for the print order or whether each of said receivers is to be individually charged for a respective portion of the print order request.

2. The print service system according to claim 1, wherein said print request information includes print condition information for each of said receivers associated with said one digital image and wherein said print condition information comprises at least one of number of prints for a respective receiver and print size.

3. The print service system according to claim 2, wherein an association of said print condition information with said digital image information is performed by appending additional information to said digital image information.

4. The print service system according to claim 1, wherein said input receiver identification information associated with said one digital image comprises address information for each of said receivers and wherein said print order management apparatus uses said address information to determine a printing location for each of said receivers.

5. The print service system according to claim 1, wherein said receiver information comprises print charge payment information of said receivers and wherein the informational element in said print order information indicates that each of said receivers will pay individually for the respective portion of the print order request.

6. The print service system according to claim 1, wherein said receiver information acquired by said print order management apparatus includes pre-registered information.

7. The print service system according to claim 1, wherein said print request information generating apparatus inputs said receiver information corresponding to said input receiver identification information, and
   said receiver information acquired by said print order management apparatus includes information generated and sent together with said print request information by said print request information generating apparatus.

8. The print service system according to claim 1, wherein said print request information generating apparatus is a digital camera.

9. The print service system according to claim 1, wherein said print request information generating apparatus is a digital camera or a terminal to which a recording medium storing digital image information can be connected.

10. The print service system according to claim 1, wherein said print order management apparatus is a server computer connected to a network.

11. The print service system according to claim 1, wherein said print order management apparatus outputs information to notify said receivers of completion of printing at said printing location.

12. A print service method for performing a print generating service which is based on digital image information comprising at least one digital image by using a computer, said method comprising:
inputting said digital image information with which is associated receiver identification information to identify one or more receivers, wherein, for one digital image, said receiver identification information associated with said one digital image comprises a plurality of receivers who want prints of said one digital image;
acquiring receiver information comprising a method for receiving the generated prints for each of the receivers identified by said receiver identification information;
determining a printing location for each of said receivers based on said receiver information; and
sending to said printing location print order information for each of said receivers comprising said digital image information to be printed,
wherein the print order information further comprises an informational element, which indicates whether a requestor of the print order is to be charged for the print order or whether each of said receivers is to be individually charged for a respective portion of the print order.

13. The print service method according to claim 12, wherein print condition information for each of said receivers is associated with said input digital image information in correspondence to said receiver identification information.

14. The print service method according to claim 12, wherein an association of said print condition information with said digital image information is performed by appending additional information to said digital image information.

15. The print service method according to claim 12, wherein said receiver information includes address information of said receivers; and
wherein, in said step of determining a printing location for each of said receivers, said address information is utilized.

16. The print service method according to claim 12, wherein said receiver information acquired includes pre-registered information.

17. The print service method according to claim 12, further comprising:
a step of notifying said receivers of completion of printing at said printing location.

18. A print order management apparatus used for a print generating service which is based on digital image information comprising at least one digital image, said apparatus performs the functions of:
inputting said digital image information with which is associated receiver identification information to identify one or more receivers, wherein for one digital image, said receiver identification information associated with said one digital image comprises a plurality of receivers who want prints of said one digital image;
acquiring receiver information comprising a method for receiving the generated prints for each of the receivers identified by said receiver identification information;
determining a printing location for each of said receivers based on said receiver information; and
sending to said printing location the-print order information for each of said receivers,
wherein the print order information further comprises an international element, which indicates whether a requestor of said print order is to be charged for the print order or whether each of said receivers is to be individually charged for a respective portion of the print order.

19. The print order management apparatus according to claim 18, wherein print condition information for each of said receivers is associated with said input digital image information in correspondence to said receiver identification information.

20. The print order management apparatus according to claim 18, wherein an association of said print condition information with said digital image information is performed by appending additional information to said digital image information.

21. The print order management apparatus according to claim 18, wherein said receiver information includes address information of said receivers, and
wherein determination of a printing location for each of said receivers uses said address information.

22. The print order management apparatus according to claim 18, wherein said receiver information acquired includes pre-registered information.

23. The print order management apparatus according to claim 18, further performing the function of:
outputting information for notifying of completion of printing at said printing location to said receiver, after completion of said printing.

24. The print order management apparatus according to claim 18, said apparatus being a server computer connected to a network.

25. A print request information generating apparatus used for a print generating service based on digital image information comprising at least one digital image, performs the functions of:
inputting receiver identification information to identify print receivers who want prints of said digital image information, wherein for one digital image, said input receiver identification information associated with said one digital image comprises a plurality of receivers who want prints of said one digital image;
associating said input receiver identification information with said digital image information; and
sending print request information including said digital image information with which said receiver identification information is associated to print order management apparatus for managing print orders of said print generating service,
wherein said print request information further comprises an informational clement, which indicates whether a requestor of said print request is to be charged for the print order or whether each of said receivers s to be individually charged for a respective portion of the print request.

26. The print request information generating apparatus according claim 25,
wherein said print request information includes print condition information for each of said receivers associated with said digital image information.

27. The print request information generating apparatus according to claim 25,
wherein an association of said print condition information with said digital image information is performed by appending additional information to said digital image information.

28. The print request information generating apparatus according to claim 25, said apparatus further performing the functions of:
inputting said receiver information corresponding to said input receiver identification information; and
sending said input receiver information together with said print request information to said print order management apparatus.

29. The print request information generating apparatus according to claims 25, said apparatus being a digital camera.

30. The print request information generating apparatus according to claim 25, said apparatus being a digital camera or a terminal to which a recording medium storing digital image information can be connected.

31. A print service system for performing print generating services, the system comprising:
an image display apparatus which displays a digital image, queries for input of a print request order for said displayed digital image, wherein, when printing of the displayed digital image is desired, the print request order is input, and wherein the print request order comprises a plurality of receivers who wants prints of the displayed digital image and for each of the plurality of receivers a method for receiving the generated print of the digital image is provided; and
a print order management apparatus which determines an optimum printing location for each of the plurality of receivers based on personal information about a respective receiver, and sends to the optimum printing location print request information for each of said receivers,
wherein said print request order information further comprises an informational element, which indicates whether a requestor of said print order is to be charged for the pant request order or whether each of said receivers is to be individually charged for respective portion of the print request order.

32. The print service system according to claim 31, wherein the image display apparatus obtains said personal information of each receiver and displays a plurality of digital images obtaining the print request order information for each of the displayed images, combines the print request orders obtained for each of the displayed images into one combined print order and provides the combined print order to the print order management apparatus.

33. The print service system according to claim 32, wherein the image display apparatus obtains a payment method for the combined print order, the payment method being selected by a requestor as one of the combined order will be paid by the requestor and each of the receivers are to be charged separately for prints requested by a respective receiver.

34. The print service system according to claim 31, wherein the personal information of each of the receivers comprises name and address of an entity that wants print of the displayed digital image, and wherein the print order management apparatus determines the optimum printing location for a respective receiver based on proximity of the address of the respective receiver to a respective printing location selected from a plurality of print locations.

* * * * *